United States Patent
Messinger

(10) Patent No.: US 11,510,422 B1
(45) Date of Patent: Nov. 29, 2022

(54) METHOD FOR MANUFACTURING OF FROZEN CONFECTION PRODUCT

(71) Applicant: Samuel Messinger, Ramot Bet Shemish (IL)

(72) Inventor: Samuel Messinger, Ramot Bet Shemish (IL)

(*) Notice: Subject to any disclaimer, the term of this patent is extended or adjusted under 35 U.S.C. 154(b) by 0 days.

(21) Appl. No.: 17/409,813

(22) Filed: Aug. 24, 2021

Related U.S. Application Data

(62) Division of application No. 16/889,829, filed on Jun. 2, 2020, now abandoned.

(51) Int. Cl.
  *A23G 9/28* (2006.01)
  *B65D 85/78* (2006.01)
  *A23G 9/50* (2006.01)

(52) U.S. Cl.
  CPC ............ *A23G 9/288* (2013.01); *A23G 9/283* (2013.01); *A23G 9/506* (2013.01); *B65D 85/78* (2013.01); *A23G 9/282* (2013.01)

(58) Field of Classification Search
  None
  See application file for complete search history.

(56) References Cited

U.S. PATENT DOCUMENTS

| | | | | |
|---|---|---|---|---|
| 2,334,654 A | * | 11/1943 | Sportolari | A23G 9/288 426/306 |
| 4,910,030 A | | 3/1990 | Trojahn | |
| 5,738,895 A | * | 4/1998 | Fuchs | A23G 9/083 425/126.2 |
| 5,887,298 A | | 3/1999 | Semidey | |
| 7,754,260 B2 | | 7/2010 | Kruik et al. | |
| 2003/0068423 A1 | * | 4/2003 | Cathenaut | A23G 9/48 426/578 |
| 2006/0280826 A1 | | 12/2006 | Mange et al. | |
| 2008/0248171 A1 | * | 10/2008 | Edens | B65D 85/78 426/115 |
| 2018/0289033 A1 | * | 10/2018 | Schroeder | A23G 9/083 |

FOREIGN PATENT DOCUMENTS

| | | |
|---|---|---|
| EP | 3379939 | 10/2018 |
| GB | 987951 | 3/1965 |

\* cited by examiner

*Primary Examiner* — Jenna A Watts

(57) ABSTRACT

A system for manufacturing and packaging one or more frozen confection products said system comprising one or more production machines, wherein the one or more production machines comprises chemical applying unit configured to apply one or more anti-moisture chemicals on a hollow wafer. The processing unit is configured to insert the hollow wafer inside the first half of an equally divided mould. The second half of the equally divided two part mould is coupled with the first half to form a closed mould. One or more funnels configured to inject at least two portions of one or more frozen confection material into the closed mould, wherein one portion of the at least two portions of the one or more frozen confection material are injected in the hollow wafer. The closed mould injected with the at least two portions of the one or more frozen confection material to form the one or more frozen confection product. The packaging section is configured to extract the one or more frozen confection products from the closed mould, wherein the one or more frozen confection products comprise at least two portions of the one or more frozen confection material filled inside the hollow wafer. A method for preparing a frozen confection product is also disclosed.

12 Claims, 10 Drawing Sheets

METHOD FOR MANUFACTURING OF FROZEN CONFECTION PRODUCT

CROSS REFERENCE TO RELATED APPLICATIONS

The present application is a Divisional Application of a U.S. patent application Ser. No. 16/889,829 filed on Jun. 2, 2020, the entire content of which are hereby expressly incorporated by reference.

TECHNICAL FIELD OF THE INVENTION

The present subject matter generally relates to frozen confection products. In particular, the present invention relates to a method and system for producing and manufacturing frozen confection products.

BACKGROUND OF THE INVENTION

Frozen confections are very popular and one of the most ancient desert. Over a period of time, many types of frozen confections have been invented, such as ice creams, jellies, fruit gums, gummies, chocolates, etc. Frozen confections, especially packaged ice cream have various ways to be served. For example, ice cream can be frozen on sticks, in cups or cones. The sticks and cups are non-edible in nature, making the process of freezing of the ice cream easier as compared to ice cream cone. However, cones are edible in nature and hence make the ice cream tastier with an add-on cone/hollow wafer.

Frozen confection products such as ice cream cones are most popular amongst other types of ice cream, as they let us hold the scoop without a cup and eat it without a spoon. Since ice creams are not limited to one single flavor, multiple flavors, for example, but not limited to, vanilla, strawberry, chocolate, mango, and many more are combined to form various kinds of multiple scoop ice creams. These ice creams are made by placing a scoop of a frozen confection material in the opening at the top of a wafer or waffle cone and are served directly to the consumer. Manual placement of ice cream from a tub with the help of disher and placing it on cone results in the melting of flavour. In case of multiple flavour ice cream cones, the taste of one flavour melts with another flavour resulting in loss of original flavours. A variety of flavours in ice creams is only enjoyed when one flavour is not melted into others while consuming the same.

Furthermore, ice cream cones are edible in nature and are generally made up of a wafer or waffle. A particularly attractive feature of these ice cream cones to consumers is the crisp of the wafer or waffle. The crisp of this wafer or waffle is affected when it comes in contact with flavoured ice cream for a longer period of time which results in sogginess.

Therefore, there exists a need to provide a crispy crunchy cone with same or different flavours are frozen properly so that each flavour is enjoyed separately without melting into one another with a crispy cone by the consumer.

SUMMARY OF THE INVENTION

The present disclosure overcomes one or more shortcomings of the prior art and provide additional advantages discussed throughout the present disclosure. Additional features and advantages are realized through the techniques of the present disclosure. Other embodiments and aspects of the disclosure are described in detail herein and are considered a part of the claimed disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

In one non-limiting embodiment, the present invention provides a system for manufacturing and packaging one or more frozen confection products said system comprising one or more production machines and a processing unit. The one or more production machines comprise chemical applying unit configured to apply one or more anti-moisture chemicals on a hollow wafer. The processing unit is configured to insert the hollow wafer inside the first half of an equally divided two part mould. A second half of the equally divided two part mould is coupled with the first half to form a closed mould. One or more funnels are configured to inject at least two portions of one or more frozen confection material into the closed mould, wherein one portion of the at least two portions of the one or more frozen confection material is injected in the hollow wafer. The closed mould injected with the at least two portions of the one or more frozen confection material to form the one or more frozen confection product. The system further comprises a packaging section configured to extract the one or more frozen confection products from the closed mould, wherein the one or more frozen confection products comprise at least two portions of the one or more frozen confection material filled inside the hollow wafer. One or more frozen confection product is packaged after extracting from the closed mould 702.

In another non-limiting embodiment of the present invention, the one or more anti-moisture chemicals are applied by one or more spraying means.

In another aspect of the present invention provides a method for preparing a frozen confection product, said method comprising steps of providing the equally divided two part mould, applying one or more anti-moisture chemicals on a hollow wafer, thereafter inserting the hollow wafer inside a first half of the equally divided two part mould followed by coupling a second half of the equally divided two part mould with the first half to form a closed mould further injecting at least two portions of one or more frozen confection material into the closed mould, wherein one portion of the at least two portions of the one or more frozen confection material is injected in the hollow wafer. Furthermore, freezing the closed mould injected with the at least two portions of the one or more frozen confection material to form the frozen confection product and extracting the frozen confection product from the closed mould, wherein the frozen confection product comprises at least two portions of the one or more frozen confection material filled inside the hollow wafer followed by packaging of the frozen confection product after extracting the same from the closed mould.

In one embodiment of the present invention, the method further comprises at least two portions of the one or more frozen confection material comprise the same flavours of the frozen confection material.

In another embodiment of the present invention, the method further comprises at least two portions of the one or more frozen confection material comprise different flavours of the frozen confection material.

In yet another embodiment of the present invention, the method further comprises the at least two portions of the one or more frozen confection material are injected based on a pre-defined weight or a pre-defined volume.

In another aspect of the present invention provides a packaged frozen confection product, said product comprising a frozen confection product; one or more packaging material covering the frozen confection product, wherein the frozen confection product is manufactured by providing the equally divided two part mould; applying one or more anti-moisture chemicals on a hollow wafer; inserting the hollow wafer inside a first half of the equally divided two part mould; coupling a second half of the equally divided two part mould with the first half to form a closed mould; injecting at least two portions of one or more frozen confection material into the closed mould, wherein one portion of the at least two portions of the one or more frozen confection material is injected in the hollow wafer; freezing the closed mould injected with the at least two portions of the one or more frozen confection material to form the frozen confection product; extracting the frozen confection product from the closed mould, wherein the frozen confection product comprises at least two portions of the one or more frozen confection material filled inside the hollow wafer; and packaging the frozen confection product after extracting the same from the closed mould to form the packaged frozen confection product.

In one embodiment of the present invention, the product further comprises one or more packaging material which is disposable.

Other aspects, advantages, and salient features of the invention will become apparent to those skilled in the art from the following detailed description, which, details the invention in different embodiments.

BRIEF DESCRIPTION OF DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of a system and/or methods in accordance with embodiments of the present subject matter are now described, by way of example only, and with reference to the accompanying figures, in which.

Figure 1:
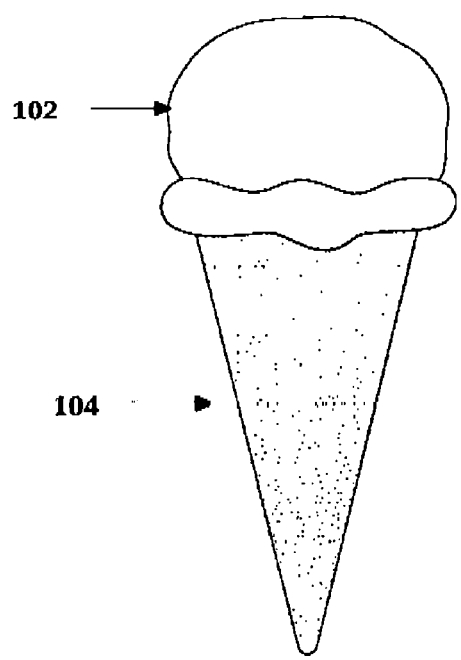
FIG. 1 discloses a conventionally known frozen confection item having a portion of frozen confection material.

It should be appreciated by those skilled in the art that any block diagrams herein represent conceptual views of illustrative systems embodying the principles of the present subject matter.

DETAILED DESCRIPTION OF THE INVENTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", "include(s)", or any other variations thereof, are intended to cover a non-exclusive inclusion, such that a setup, system or a method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practised. These embodiments are described in sufficient detail to enable those skilled in the art to practice the disclosure, and it is to be understood that other embodiments may be utilized and that changes may be made without departing front the scope of the present disclosure. The following description is, therefore, not to be taken in a limiting sense.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The use of terms "including." "comprising," or "having" and variations thereof herein are meant to encompass the items listed thereafter and equivalents thereof as well as additional items.

Further, the terms. "an" and "a" herein do not denote a limitation of quantity, but rather denote the presence of at least one of the referenced item. Referring to the drawings, the invention will now be described in more detail.

FIG. 1 discloses a conventionally known frozen confection item. The frozen confection item according to FIG. 1 comprises a base in which a portion of frozen confection material is put. The base may be made of any edible or inedible material. For example, if the frozen confection item is an ice cream cone, the base may be a waffle cone in which ice cream scoop may be inserted. Although, ice cream cone has been shown as a frozen confection item in FIG. 1, the present disclosure is not limited to the ice cream cone and may be applicable to other types of the frozen confection items.

FIG. 1 shows ice cream cone with a portion of a single flavour i.e. a single scoop ice cream. The portion may be manually inserted inside the cone by a vendor selling the ice cream cones. However, this has the following disadvantages for the consumer:
1) only one type of flavour may be enjoyed.
2) as the single scoop 102 of ice cream may be placed manually, the ice cream may spill on the corners of the cone known as overage from the packing ice cream into cone 104.
3) as the single scoop 102 of ice cream may be placed manually, the ice cream may not be filled in the cone 104 completely and a portion of the cone at the bottom may remain empty.
4) as the cone 104 may get in contact with the single scoop 102 of ice cream, there are chances that the cone may become soggy due to extra moisture.

Figure 2:
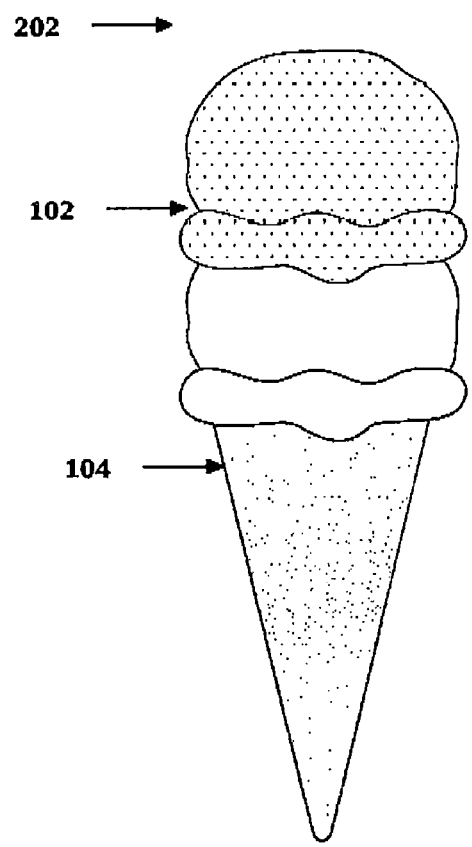
FIG. 2 discloses a conventionally known frozen confection item having two portions of frozen confection material.
Figure 3:
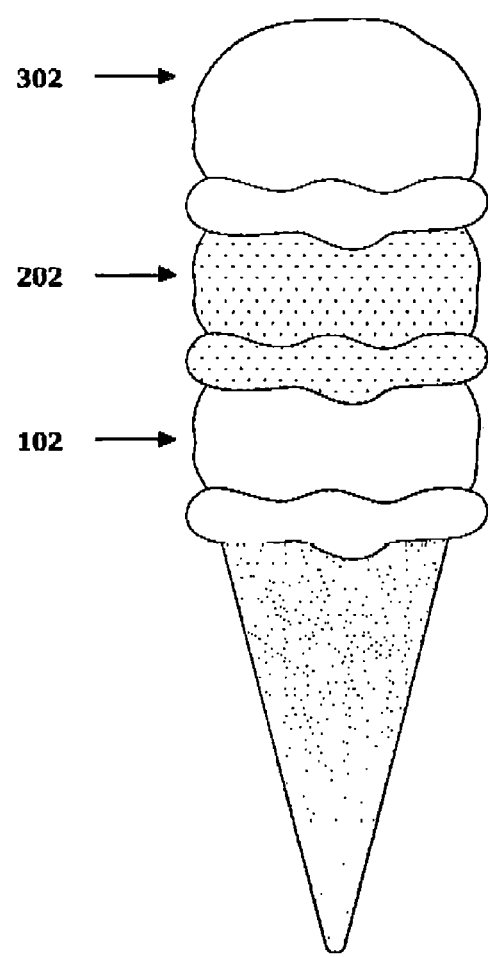
FIG. 3 discloses a conventionally known frozen confection item having three portions of frozen confection material.

Similarly, a consumer would desire to eat a frozen confection item with more than one portion of the frozen confection item. For example, a consumer would desire an ice cream cone with more than two scoops of ice cream. FIG. 2 and FIG. 3 shows such examples.

FIG. 2 shows a conventionally known frozen confection item with two portions of frozen confection material i.e. FIG. 2 shows ice cream cone with two scoops of ice cream. Although, an ice cream cone has been shown as a frozen confection item, however, the same is not limited to the ice cream cone and the present disclosure is applicable to any frozen confection item. FIG. 2 depicts a cone 104 also known as waffle cone or wafer cone along with first scoop 102 of ice cream followed by second scoop 202 of ice cream. The first scoop 102 of ice cream and the second scoop 202 of ice cream may be of same or different flavours placed manually on the top of it. The first scoop 102 of ice cream and the second scoop 202 of ice cream may be manually inserted inside the waffle cone by a vendor selling the ice cream cones. However, this has the following disadvantages for the consumer:
1) as first scoop 102 of ice cream and second scoop 202 of ice cream may be placed manually on the cone 104, in case of different flavours of scoops of ice cream, chances of melting of flavour of first scoop 102 of ice cream into the second scoop 202 of ice cream is more at the time of consumption for example, by the time vendor places the second scoop 202 of ice cream, there are chances that the first scoop 102 of ice cream has already started melting.
2) as first scoop 102 of ice cream and second scoop 202 of ice cream may be placed manually, more ice cream from the scoops may spill on the corners of the cone 104 known as overage from the packing ice cream into cone 104.
3) as first scoop 102 of ice cream and second scoop 202 of ice cream may be placed manually, the scoops of ice cream may not be filled in the cone 104 completely leaving the bottom portion of the cone empty, thereby leading to wastage of space inside the cone.
4) as the cone 104 may get in contact with ice cream after placing first scoop 102 of ice cream and second scoop 104 of ice cream manually, it may become soggy due to extra moisture.

FIG. 3 shows a conventionally known frozen confection item with three portions of frozen confection material i.e. FIG. 3 shows an ice cream cone with three scoops of same or different flavours placed in a cone. Although, ice cream cone has been shown as a frozen confection item in FIG. 3, the present disclosure is not limited to the ice cream cone and may be applicable to other types of the frozen confection items. FIG. 3 depicts a cone 104 also known as waffle cone or wafer cone along with first scoop 102 of ice cream followed by second scoop 202 of ice cream and then third scoop 302 of ice cream of same or different flavours placed manually on the top of it. The ice cream scoops may be manually inserted inside the waffle cone by the vendor selling the ice cream cones. However, this also has the following disadvantages for the consumer:
1) due to placing of third scoop 302 and second scoop 202 on first scoop 102 of ice cream on the cone 104, there may be distortion of the shape of the cone 104 due to pressure on cone 104.
2) as first scoop 102 of ice cream, second scoop 202 of ice cream and third scoop 302 of ice cream may be placed manually on the cone 104, in case of different flavours of ice cream, chances of melting of flavour of first scoop 102 of ice cream into the second scoop 202 of ice cream are more at the time of consumption.
3) as first scoop 102 of ice cream, second scoop 202 of ice cream and third scoop 302 of ice cream may be placed manually, more ice cream from the scoops may spill on the corners of the cone 104. This is known as overage of ice cream into cone 104 which occur at the time of packaging.
4) as first scoop 102 of ice cream, second scoop 202 of ice cream and third scoop 302 of ice cream may be placed manually, the ice cream from the scoops may not be filled completely in the cone 104 leaving bottom portion of the cone empty, thereby leading to wastage of space inside the cone.
5) as the cone 104 may get in contact with ice cream after placing first scoop 102, second scoop 202 and third scoop 302 manually, it may become more soggy due to extra moisture.

To overcome the challenges in the prior art, the present disclosure proposes one or more techniques for a method and a system for manufacturing a frozen confection product which solves the above-mentioned disadvantages.

Figure 4:
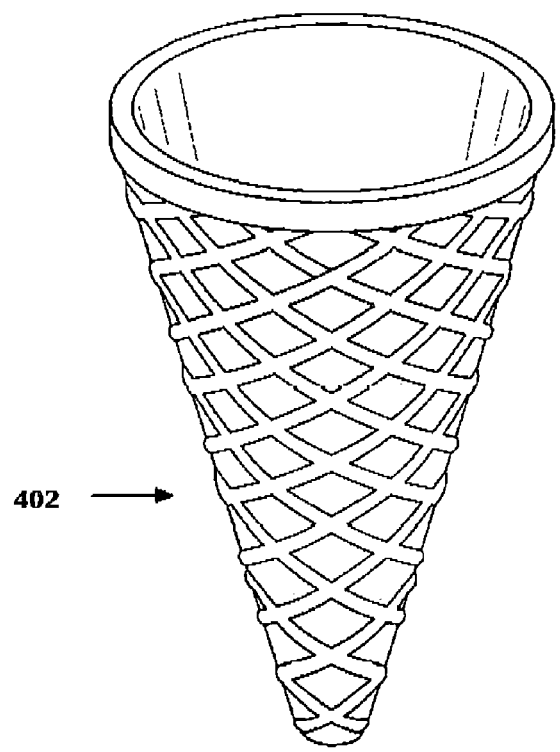
FIG. 4 discloses a hollow wafer according to an embodiment of the present disclosure.

Referring to FIG. 4, FIG. 4 shows a hollow wafer 402 according to an embodiment of the present disclosure. The hollow wafer 402 may preferably comprise what is commonly known in the industry as a "wafer cone". "waffle cone" or "sugar cone". The hollow wafer 402 as shown in FIG. 4 may be a conventionally known wafer made from leavened batter or dough that is cooked between two plates that are patterned to give a characteristic size, shape, and surface impression. The basic ingredients to make the hollow wafer 402 maybe flour, butter, sugar, yeast, milk, eggs, etc. The hollow wafer 402 may be made by methods known in the art, hence the description of the process of manufacturing the hollow wafer 402 has been omitted here.

An edible coating of one or more anti-moisture chemicals is applied on the hollow wafer 402 before placing the hollow wafer 402 inside the equally divided two part mould 600. The edible coating of the one or more anti-moisture chemicals is selected from a group comprising of inulin (IN), gelatine (GE), whey (WH) and glycerol (GLY) added with

*Lactobacillus casei* Shirota (LBC). The one or more anti-moisture chemicals may be applied on the hollow wafer 402 such that the anti-moisture chemical completely covers the hollow wafer 402. In one embodiment, the one or more anti-moisture chemicals may be applied by one or more spraying means. The spraying means may include means such as spraying pump, bottles or pipes.

Although the hollow wafer 402 has been shown in a conical shape, the shapes of the hollow wafer may not be limited to the one shown here. In one embodiment, the hollow wafer 402 may have a shape of a poke or a cornet. The hollow wafer 402 may have an open top and an opposed closed bottom with a pointed or flat base. In one embodiment, the hollow wafer 402 may be a cone-shaped pastry baked into a thin, crispy, cracker-like texture, with or without an embossed waffle texture, but other textures can be used and still be within the scope of this invention. The anti-moisture chemical may have a melting point of about 30-50° C. and should, therefore, be solid at room temperature. The anti-moisture chemical may help in keeping the characteristics of the hollow wafer 402 such as texture, moisture and colour intact.

Figure 5:
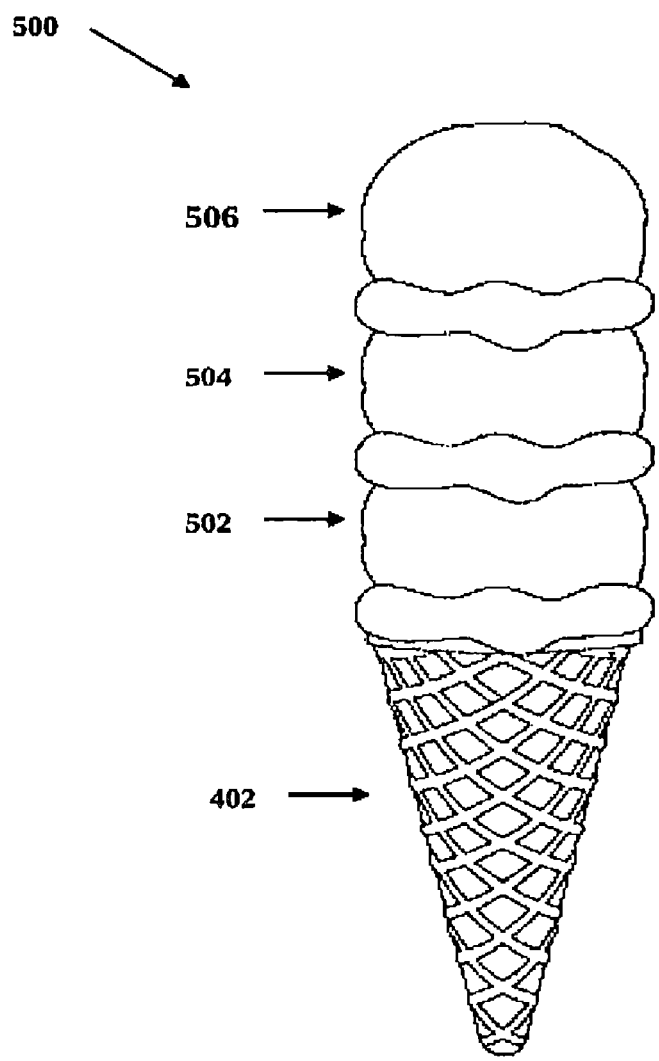
FIG. 5 discloses a frozen confection product having three portions confection material according to one embodiment of the present disclosure.

Referring to FIG. 5, FIG. 5 shows a frozen confection product 500 according to the present invention. The frozen confection product 500 comprises the hollow wafer 402 placed in the equally divided two part moulds 600 (mould is shown in FIG. 6).

Figure 6:
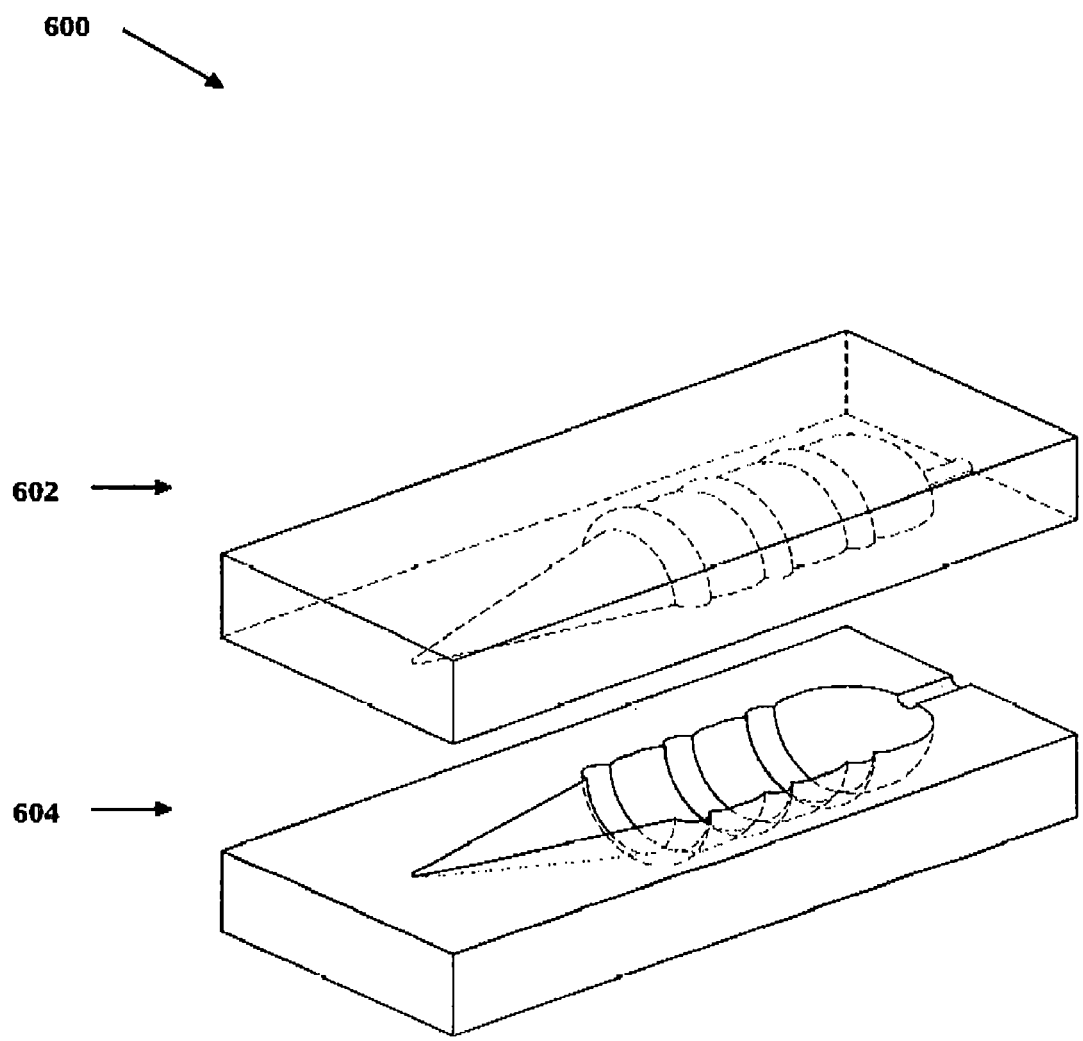
FIG. 6 discloses an equally divided two part mould for manufacturing of frozen confection product according to an embodiment of the present disclosure.

Referring to FIG. 6, FIG. 6 shows an equally divided two part mould 600 for manufacturing of frozen confection product according to an embodiment of the present disclosure The two part mould is equally divided into two halves—a first half 602 and a second half 604. The first half 602 and the second half 604 are divided equally such that both the first half 602 and the second half 604 have the same shape. The equally divided two part mould 600 is used to manufacture the frozen confection product 500. Hence, the shape of the equally divided two part mould 600 may be in the shape of the frozen confection product 500 which is being manufactured. For example, the frozen confection product 500 to be manufactured may be a 3 scoop ice cream. Thus, the shape of the equally divided two pan mould 600 may resemble the shape of the 3 scoop ice cream having a conical at the bottom and in the form of scoops at the top. An exemplary shape of the equally divided two part mould 600 for manufacturing ice cream is shown in FIG. 6.

The first half 602 and the second half 604 of the equally divided two part mould 600 may be coupled together by one or more coupling means. The one or more coupling means may include grooving means, adhesive means or any other way of coupling the first half 602 and the second half 604. For grooving means, the second half 604 may have one or more grooves placed on the interior of the second half 604 and the first half 602 may have means which may fit into the grooving means of the second half 604.

In one embodiment, the equally divided two part mould 600 may be made up of one or more metal. The metal may be aluminium. In another embodiment, the equally divided two part mould 6100 may be made of plastic. However, the material of equally divided two part mould 600 is not limited to the one mentioned here.

Referring back to FIG. 5, After spraying the edible coating of anti-moisture chemical on the hollow wafer 402, the hollow wafer 402 is placed in the first half 602 of the equally divided two part mould 600. The hollow wafer 402 may be placed such that the first half 602 completely covers the hollow wafer 402 from one side. Once the hollow wafer 402 is placed inside the first half 602 of the equally divided two part mould 600, the second half 604 of the equally divided two part mould 600 is coupled with the first half 602 of the equally divided two part mould 600 to form a closed mould 702. The closed mould 702 formed by the coupling of first half 602 and second half 604 may have an opening 704 at the top. The opening 704 may be used to fill the frozen confection material inside the closed mould 702.

Once the closed mould 702 is formed, the frozen confection material is injected into the closed mould 702. The frozen confection material is injected so as to fill the complete closed mould 702 including the hollow wafer 402 placed inside the closed mould 702. The frozen confection material is injected using one or more funnels 706. The frozen confection material may be injected in the closed mould 702 from the containers 710 with the help of funnels 706.

In one embodiment, the frozen confection material of single flavour is injected inside the closed mould 702. In another embodiment, the frozen confection material of more than one flavour is injected inside the closed mould 702. The different flavours may include but not limited to chocolate, vanilla, strawberry, butterscotch.

In one embodiment, the frozen confection material is filled inside the closed mould 702 in a pre-defined weight or pre-defined volume. The pre-defined weight or the pre-defined volume of the frozen confection material may depend on the amount of frozen confection material to be filled inside the closed mould 702. In other words, the frozen confection material is filled in such a quantity such that the closed mould 702 is completely filled with the frozen confection material.

In one embodiment, the frozen confection material is present in a semi-frozen form inside the containers 710. Thus, the frozen confection material is injected in a semi-frozen form inside the closed mould 702.

Once the frozen confection material is injected inside the closed mould 702, the closed mould 702 is kept for freezing so as to form a frozen confection product 500. The freezing may be done at a pre-defined temperature usually zero degree Celsius.

Once the frozen confection product 500 is formed by freezing the frozen confection material inside the closed mould 702, the frozen confection product 500 is extracted from the closed mould 702. For example, the first half 602 and the second half 604 are de-coupled so as to open the closed mould 702.

Once the frozen confection product 500 is extracted, the frozen confection product 500 is packaged using one or more packaging means. The one or more packaging means may include disposable packaging means. The packaging means may ensure that the frozen confection product 500 is free from damages during transportation of the frozen confection product 500. The one or more packaging means may include the name of the frozen confection product 500, the flavours present inside the frozen confection product 500, the manufacturing unit for manufacturing of the frozen confection product 500, etc.

As can be clearly seen from the above explanation, the equally divided two part mould 600 plays an important role while shaping and placing of frozen confection material into the hollow wafer 402 shown in FIG. 4.

Figure 7:
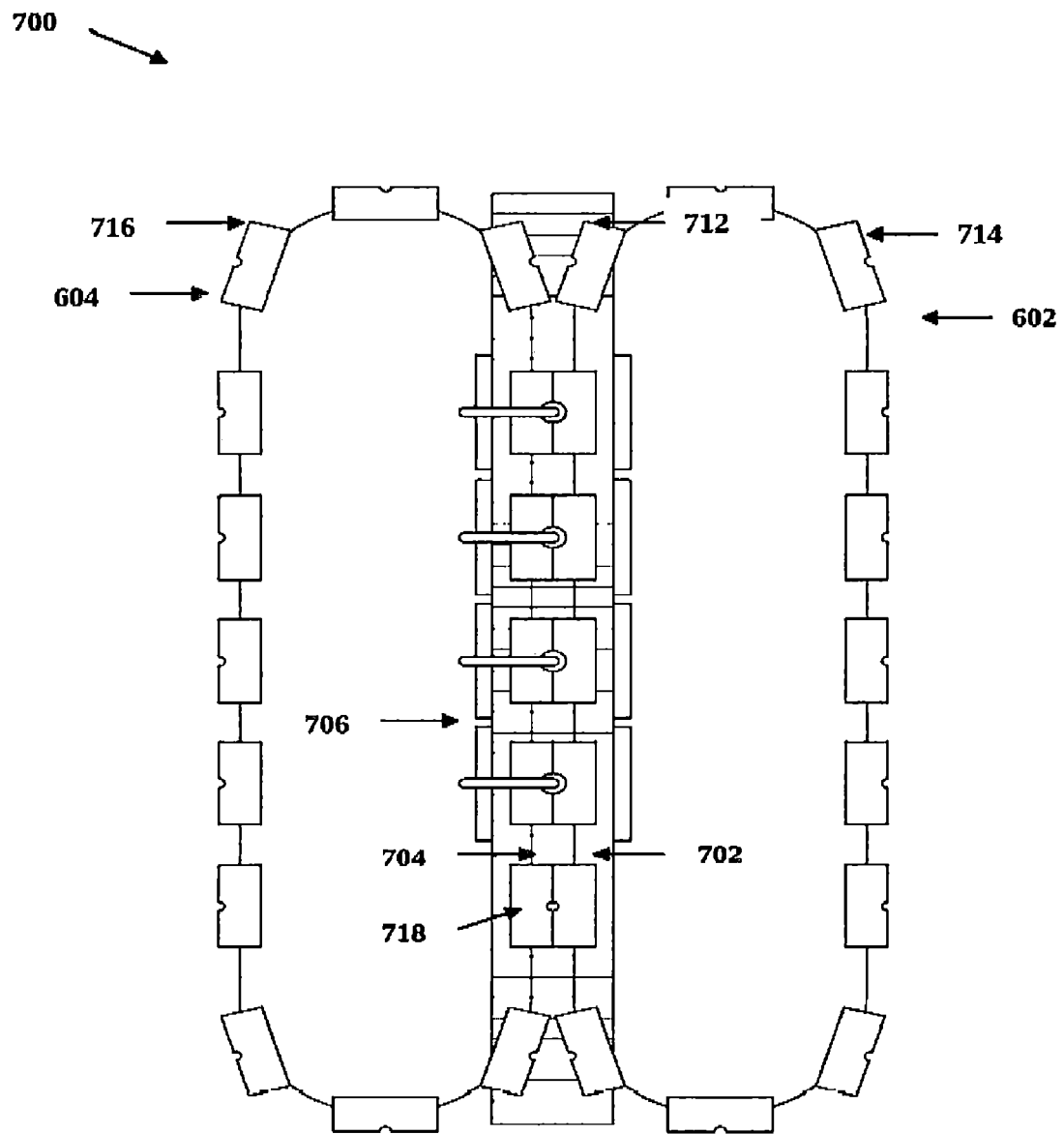
FIG. 7 discloses a system for producing and manufacturing frozen confection product according to an embodiment of the present disclosure.

Referring to FIG. 7 now, FIG. 7 shows a system 700 for manufacturing and packaging frozen confection product 500 according to an embodiment of the present disclosure. FIG. 7 shows various hardware embodiments for manufacturing and packaging the frozen confection product 500. FIG. 7 shows a manufacturing unit environment where the one or more frozen confection products are produced. The manufacturing unit maybe a factory.

The system 700 according to FIG. 7 comprises a rotatory belt 712, a left rotatory belt 714, a right rotatory belt 716, containers 710, funnels 706, first half 602 of the equally divided two part mould 600, second half 604 of the equally divided two part mould 6M), closed mould 702.

The rotatory belt 712 is used for commercial-scale manufacturing and manufacturing of frozen confection product 500 and may be divided into a left rotatory belt 714 and a right rotatory belt 716. The left rotatory belt 714 may be configured to rotate on the respective axis simultaneously with the axis of the rotatory belt 712. The one or more containers 710 may be placed above the right rotatory belt and the left rotatory belt. The containers 710 may have one or more outlets and one or more inlets. The containers 710 contain frozen confection material. To enable inlet of the frozen confection material, the inlet of the containers 710 maybe connected to one or more material tank which may be filled up with the frozen confection material. In one embodiment, each tank may have a frozen confection material of a single flavour. In another embodiment, each tank may have a frozen confection material of different flavour with one or more partitioning means in between. Also, in one embodiment, the containers 710 may contain frozen confection product 500 of more than one flavour. In such a case, to prevent mixing of the flavours of the frozen-confection product 500 from mixing, the containers 710 may be divided into different sections using one or more partitioning means. Each section of the container 710 may have a funnel 706. The funnel 706 may behave as an outlet of the frozen confection material.

Hereinafter, the manufacturing and packaging of the frozen confection product 500 using the system 700 will be described in more detail below:

The first half 602 of the equally divided two part mould 600 may be placed on the left rotatory belt 714. The left rotatory belt 714 may rotate on an axis in a clockwise direction.

Similarly, the second half 604 of the equally divided two part mould 600 may be placed on the right rotatory belt 716. The right rotatory belt 716 may be rotating on its axis in an anticlockwise direction. Both the left rotatory belt 714 and the right rotatory belt 716 may rotate such that the first half 602 and the second half 604 meet at a point (718) where the first half 602 of the equally divided two part mould 600 and die second half 604 of the equally divided two part mould 600 gets coupled to each other. Just before coupling the first half 602 and the second half 604, the hollow wafer 402 may be placed inside the first half 602 and between the first half 602 and the second half 604. Thus, the closed mould 702 is formed like this with the hollow wafer 402 in between. The closed mould 702 thus formed may rotate with the help of rotatory belt 712. While rotating, the closed mould 702 is filed with the frozen confection material using the funnels 706 connected to the containers 710. Thus, one or more flavours are injected in a pre-defined weight/volume from the funnels 706. The funnels 706 may inject the frozen confection material inside the closed mould 702 using an air pressure which is above a pre-defined threshold.

The closed mould 702 filled with same or different flavours of frozen confection material maybe bordered on freezing temperature, so that the flavours do not melt and mixed with each other before packaging of the frozen confection product 500.

After freezing the closed mould 702 filled with same or different flavours of frozen confection material, the frozen confection product 500 is formed. The frozen confection product 500 so formed may be extracted with the help of extracting tools such as a spatula.

Once the frozen confection product 500 is extracted, the frozen confection product 500 is packaged using one or more packaging means.

Although, the manufacturing and packaging of a single confection product has been explained above, please note that a plurality of frozen confection products may be manufactured and packaged simultaneously using the system 700 as described above.

In another embodiment according to the present invention, the frozen confection material may be filled in the equally divided two part mould 60) without placing the hollow wafer 402 in the equally divided two part mould 600. In this embodiment, hollow wafer 402 may be provided separately to the consumer along with frozen confection. Thus, in this embodiment, the equally divided two part mould 600 may contain frozen confection material of one or more flavours. The shape of equally divided two part mould 600 may be narrowed down, so that the frozen confection product 50M (formed without the hollow wafer 402 in this case) may be placed in the hollow wafer 402 provided separately. In this embodiment, the hollow wafer 402 may not get soggy at all until the product is consumed.

Figure 8:
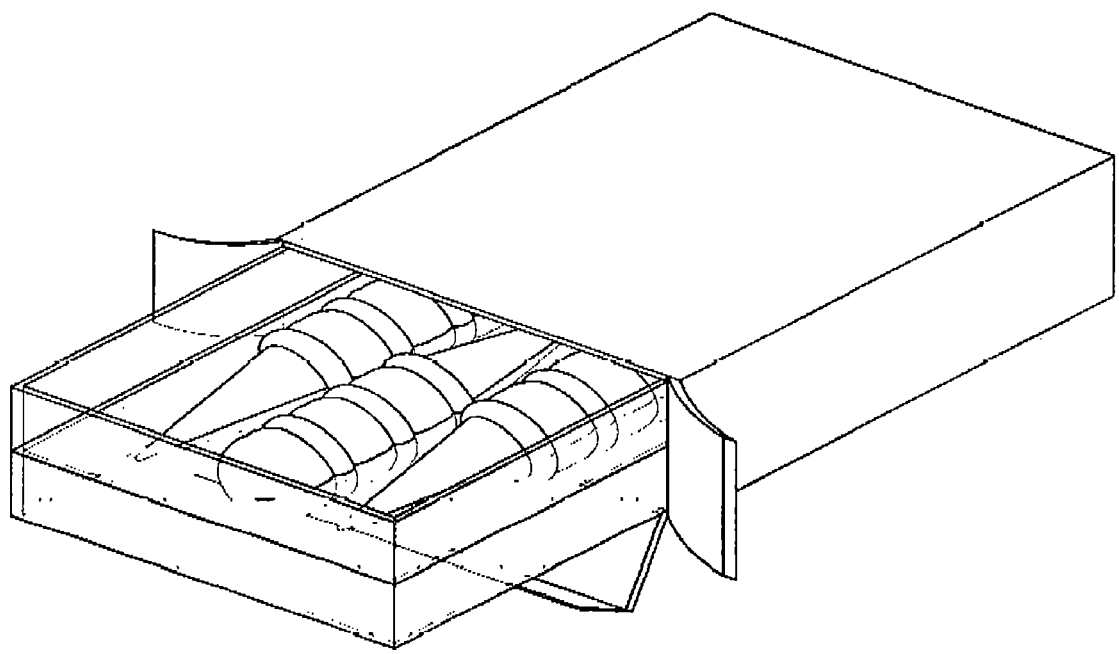
FIG. 8 discloses a packaged frozen confection product.
Figure 9:
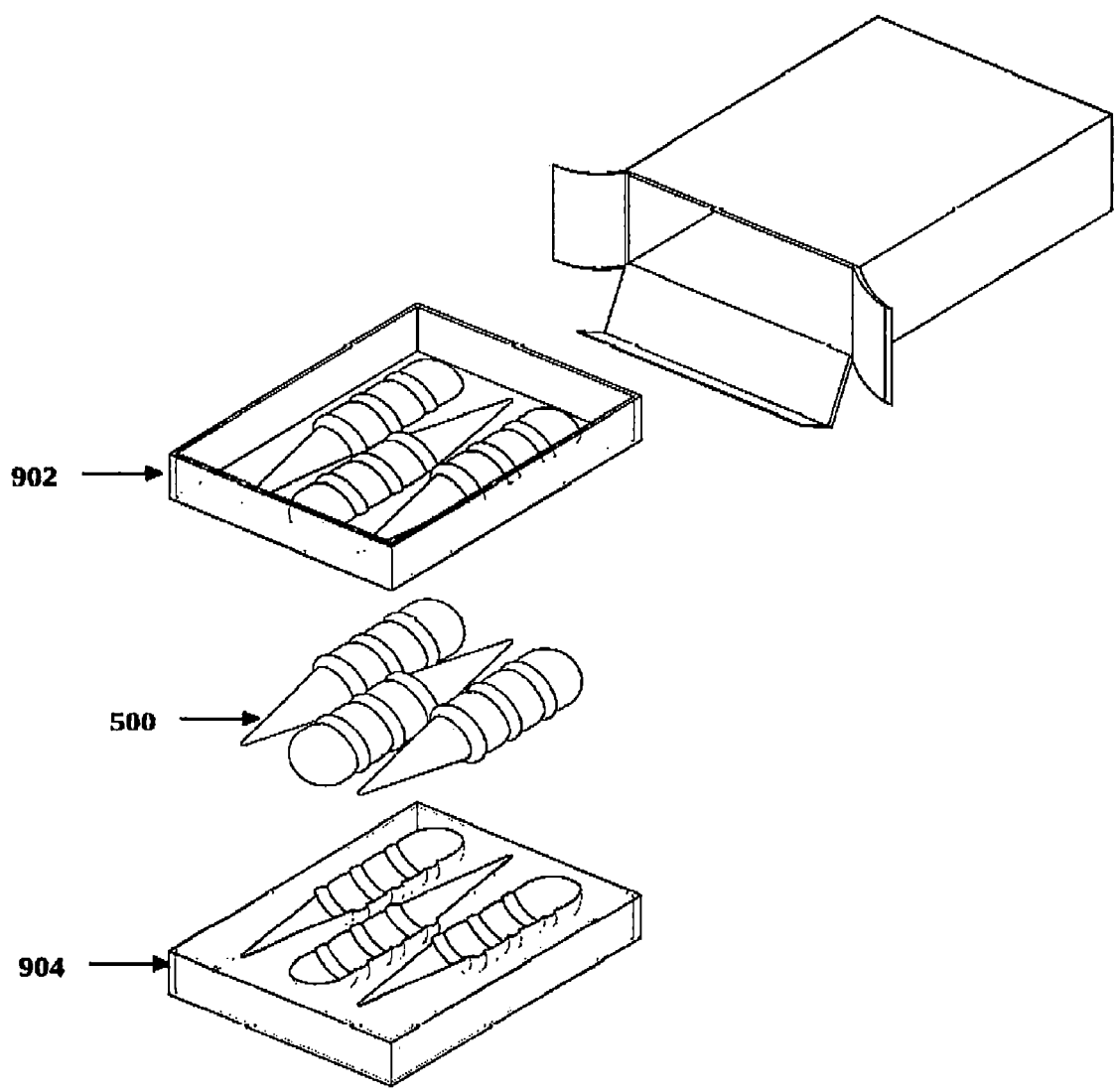
FIG. 9 shows a transporting means for frozen confection product 500 according to an embodiment of the present disclosure.

Referring to FIGS. 8 and 9, FIGS. 8 and 9 shows one or more means for transporting the frozen confection product. As explained above, the frozen confection product 500 may be extracted with the help of extracting tools. Once extracted, the frozen confection product 500 wrapped in the box as shown in FIG. 8. As explained above, the box used to wrap the frozen confection product 500 may be disposable. The box used to wrap the frozen confection product 500 may have holder embedded in it. The holder may have a shape of an equally divided two part frozen confection holder. One part of an equally divided two part frozen confection holder may be known as top half 902 and the other part may be known as bottom half 904. Both, top half 902 and bottom half 904 may have a shape of the equally divided two part mould 600 so as to fix the frozen confection product 500 formed ater extraction from the equally divided two part mould 600. The top half 902 of the holder and bottom half 904 of the holder may be coupled after placing the frozen confection product 500 between the top half (902) and the bottom half (904) of the holder. This coupling of the top half 902 of the holder and bottom half 904 of the holder may be done so as to form a closed holder. These closed holders may then pack in the boxes for transporting of the frozen confection products. In one embodiment, the box may contain, for example, but not limited to, the name of the frozen confection product, number of frozen confection product placed inside the box, the brand manufacturing the frozen confection product, etc.

The present invention may now be explained using an exemplary embodiment. In this embodiment, the frozen confection product has been assumed as ice cream. The ice cream may have a hollow waffle at the bottom with three scoops in the hollow waffle, where the three scoops are of three different flavours i.e. vanilla, butterscotch and chocolate. On a hollow waffle, anti-moisture chemicals may be applied and the hollow waffle may be placed on the first half of the equally divided two part mould. Next, the second half of the equally divided two part mould may be coupled with the first half of the equally divided two part mould to form a closed mould. Furthermore, three different flavours of ice cream vanilla, butterscotch and chocolate as first, second and third scoops may be injected into the closed mould one by one with an using an air pressure such that the bottom scoop vanilla completely fills the waffle. Thereupon, the closed mould having three different flavours of ice cream vanilla, butterscotch and chocolate may be kept of freezing at zero degree Celsius. The ice cream having three scoops of vanilla, butterscotch and chocolate may be extracted from the mould. The ice cream, thus extracted, maybe now packed in a box having holders to hold the ice cream while transporting the same.

Figure 10:
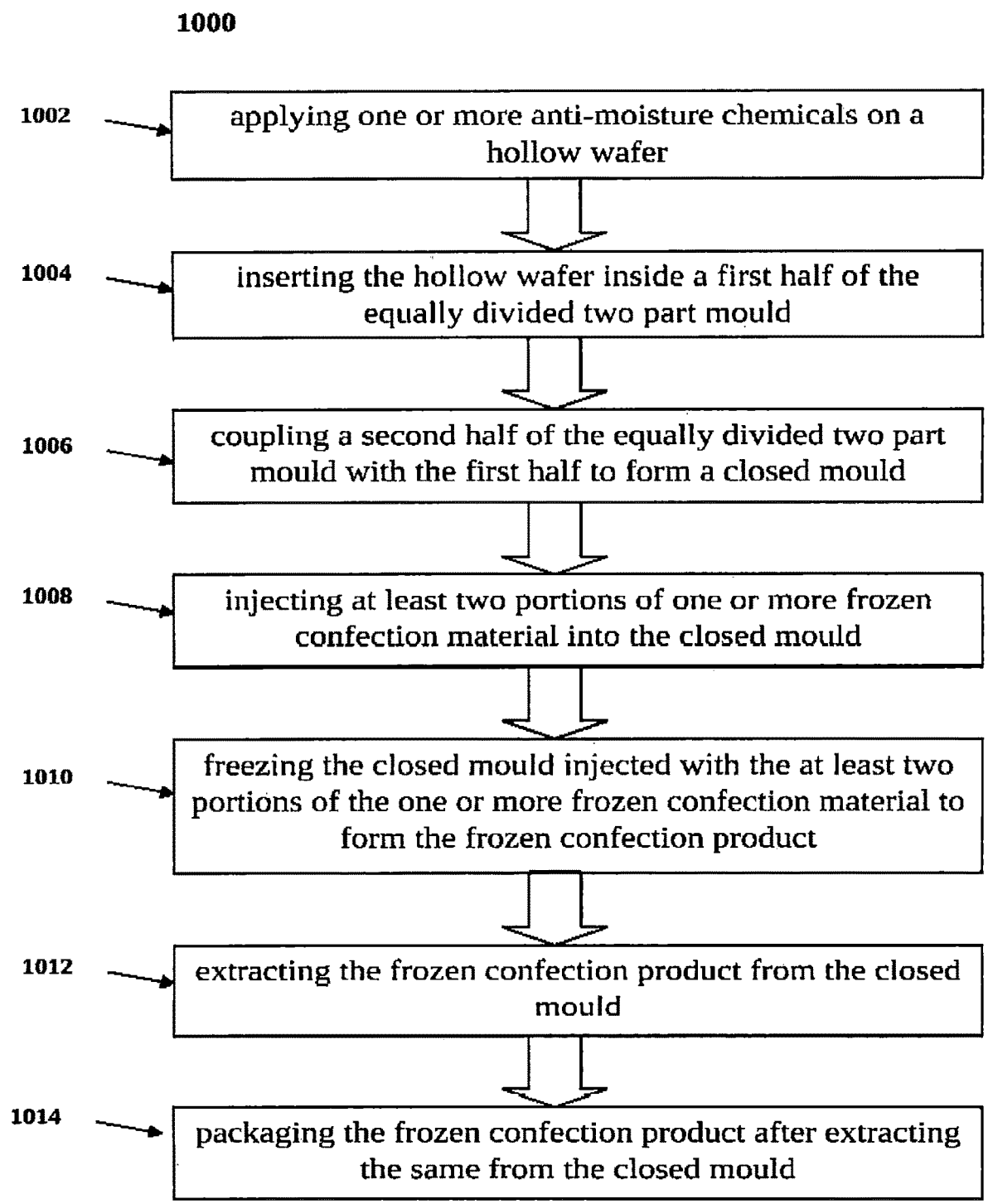
FIG. 10 shows a method for preparing a frozen confection product.

Referring to FIG. 10, FIG. 10 shows the method for manufacturing preparing a frozen confection product. At step 1002, the method comprises applying one or more anti-moisture chemicals on a hollow wafer. At step 1004, the method comprises inserting the hollow wafer 402 inside a first half 602 of the equally divided two part mould 600. At step 1006, the method comprises coupling a second half 604 of the equally divided two part mould 600 with the first half 602 to form a closed mould 702. At step 1008, the method comprises injecting at least two portions of one or more frozen confection material into the closed mould 702, wherein one portion of the at least two portions of the one or more frozen confection material are injected in the hollow wafer. At step 1010, the method comprises freezing the closed mould 702 injected with the at least two portions of the one or more frozen confection material to form the frozen confection product 500. At step 1012, the method comprises extracting the frozen confection product 500 from the closed mould 702, wherein the frozen confection product 500 comprises at least two portions of the one or more frozen confection material filled inside the hollow wafer. At step 1014, the method comprises packaging the frozen confection product 500 after extracting the same from the closed mould 702.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. It must also be noted that as used herein and in the appended claims, the singular forms "a," "an" and "the" include plural references unless the context clearly dictates otherwise.

Advantages of the Embodiment of the Present Disclosure is Illustrated Herein 1) Systematically injecting first portion followed by second portion and then third portion of frozen confection material in the hollow wafer in pre-defined volume/weight may reduce the pressure on hollow wafer. Hence, there may be little or no distortion of the shape of the hollow wafer.
2) First portion, second portion and third portion of frozen confection material may be injected with the help of funnels in the hollow wafer. Followed by freezing of these portions, so that different flavours of frozen confection material won't mix into one another. Also, there may be less or no spilling of frozen confection material on the corners of the hollow wafer known as overage produced while injecting the first portion followed by second portion and then third portion of frozen confection material in the hollow wafer.
3) First portion, second portion and third portion of frozen confection material may be injected with the help of funnels in the hollow wafer, so that the frozen confection material may be completely filled in the hollow wafer so that the hollow wafer may not remain empty.

The hollow wafer used in conventional art became soggy when the frozen confection material was poured in the waffle cone. To prevent the sogginess, the present invention provides various techniques, for example, applying an edible coating of anti-moisture chemicals on the hollow wafer, manufacturing confection product using the equally divided two part mould. Thus, the present invention will be helpful to make the frozen confection products a lot tastier, crunchy and crispy as compared to the conventionally known in the prior art.

The invention claimed is:

1. A method of preparing a packaged frozen confection product, said method comprising steps of:
providing an equally divided two part mould;
applying out or mere anti-moisture chemicals on a hollow wafer;
inserting the hollow wafer inside a first half of the equally divided two part mould, wherein the two part mould is shaped conical at the bottom with multiple adjoining hollow spheres at the top;
coupling a second half of the equally divided two part mould with the first half to form a closed mould;
injecting at least two portions of one or more frozen confection material into the closed mould, wherein one portion of the at least two portions of the one or more frozen confection material is injected in the hollow wafer;
freezing the closed mould injected with the at least two portions of the one or more frozen confection material to form the frozen confection product;
extracting the frozen confection product by decoupling to open the closed mould, wherein the frozen confection product comprises at least two portions of the one or more frozen confection material filled inside the hollow wafer; and
packaging the frozen confection product.

2. The method of preparing a packaged frozen confection product of claim 1, wherein one or more packaging material is disposable.

3. The method of preparing a packaged frozen confection product of claim 1, wherein the packaging is made of a box with an embedded holder having a shape the same as the equally divided two part mould with a top half and a bottom half.

4. The method of preparing a packaged frozen confection product of claim 3, wherein the top half and the bottom half of the packaging box are coupled after placing the frozen confection product between the top half and the bottom half.

5. The method of preparing a packaged frozen confection product of claim 1, wherein the at least two portions of the one or more frozen confection material comprises different flavours of the frozen confection material.

6. The method of preparing a packaged frozen confection product of claim 1, wherein the at least two portions of the one or more frozen confection material comprises same flavours of the frozen confection material.

7. The method of preparing a packaged frozen confection product of claim 1, wherein the at least two portions of the one or more frozen confection material are injected based on a pre-defined weight or a pre-defined volume.

8. The method of preparing a packaged frozen confection product of claim 1, wherein the one or more anti-moisture chemicals are applied by one or more spraying means.

9. The method of preparing a packaged frozen confection product of claim 1, wherein the closed mould is made up of an equally divided two part mould and the hollow wafer.

10. The method of preparing a packaged frozen confection product of claim 1, wherein the equally divided two part mould is made of metal.

11. The method of preparing a packaged frozen confection product of claim 1, wherein the one or more frozen confection material is in semi-frozen form.

12. The method of preparing a packaged frozen confection product of claim 1, wherein the one or more frozen confection material is an ice-cream.

* * * * *